H. W. GREEN.
MACHINE FOR MAKING SANITARY NAPKINS.
APPLICATION FILED JAN. 17, 1921.

1,408,586.

Patented Mar. 7, 1922.
8 SHEETS—SHEET 1.

INVENTOR.
Howard W. Green
BY Horatio E. Bellowe
ATTORNEY

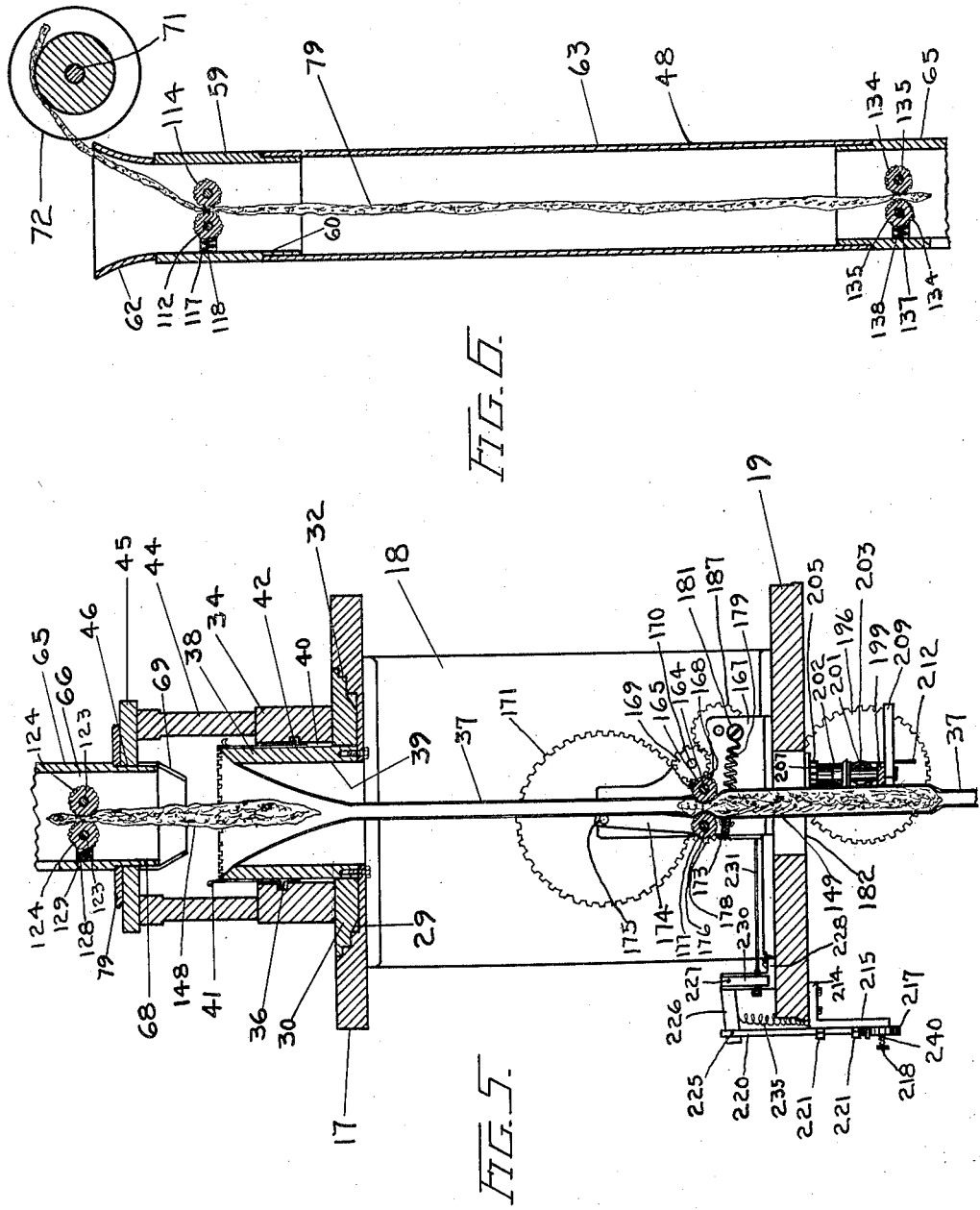

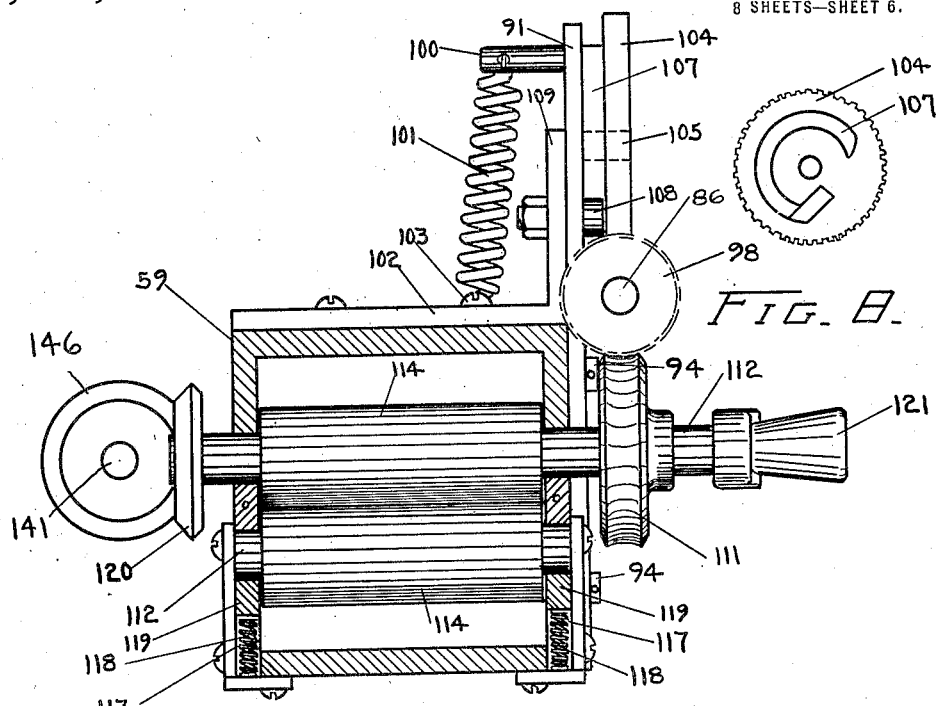
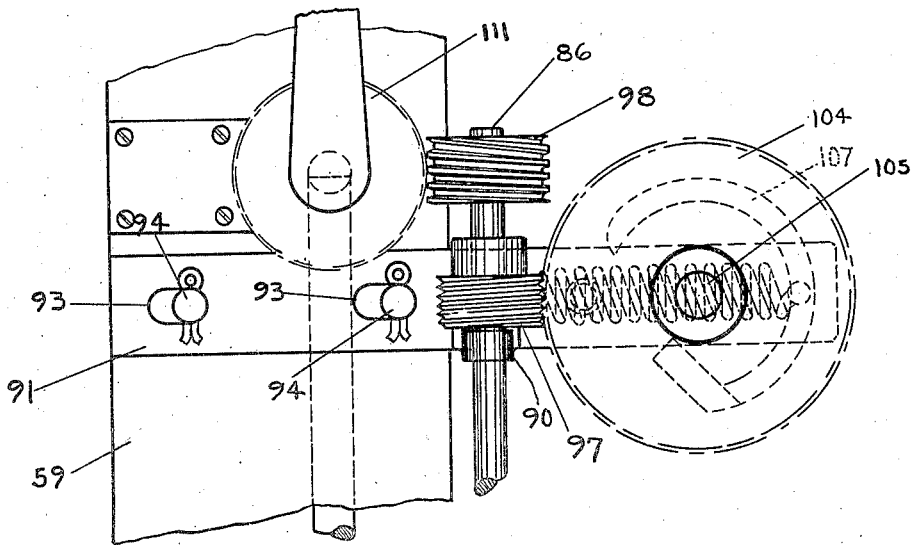

H. W. GREEN.
MACHINE FOR MAKING SANITARY NAPKINS.
APPLICATION FILED JAN. 17, 1921.

1,408,586.

Patented Mar. 7, 1922.
8 SHEETS—SHEET 7.

INVENTOR.
Howard W. Green
BY Horatio E. Bellows
ATTORNEY

H. W. GREEN.
MACHINE FOR MAKING SANITARY NAPKINS.
APPLICATION FILED JAN. 17, 1921.

1,408,586.

Patented Mar. 7, 1922.
8 SHEETS—SHEET 8.

INVENTOR.
Howard W. Green
BY
Horatio E. Bellows
ATTORNEYS.

UNITED STATES PATENT OFFICE.

HOWARD W. GREEN, OF VERSAILLES, CONNECTICUT, ASSIGNOR TO WILLIMANTIC KNITTING COMPANY, A CORPORATION OF CONNECTICUT.

MACHINE FOR MAKING SANITARY NAPKINS.

1,408,586.  Specification of Letters Patent.  Patented Mar. 7, 1922.

Application filed January 17, 1921. Serial No. 437,705.

*To all whom it may concern:*

Be it known that I, HOWARD W. GREEN, a citizen of the United States, residing at Versailles, in the county of New London and State of Connecticut, have invented certain new and useful Improvements in Machines for Making Sanitary Napkins, of which the following is a specification.

My invention relates to machines for automatically producing sanitary napkins consisting of a tubular fabric casing carrying in its intermediate portion an absorbent material, and leaving its unfilled ends to serve as attaching portions.

The essential objects of my invention are to contemporaneously fabricate and form the casing around the absorbent material; to employ the fabricating means itself to enclose the absorbent material; to avoid injury to the casing resultant from the preliminary stretching of the casing required where the absorbent material is introduced into a previously prepared casing; to insure a severing of the casing at points exactly midway of the absorbent charges; to afford an accurate and certain control of the intermittently rotating feed rolls; to facilitate the introduction of the length of absorbent material to the operating mechanism, and to increase the speed and lessen the cost of production.

To the accomplishment of the foregoing and related ends my invention consists in such parts and in such combinations of parts as fall within the scope of the appended claims.

Figure 1:
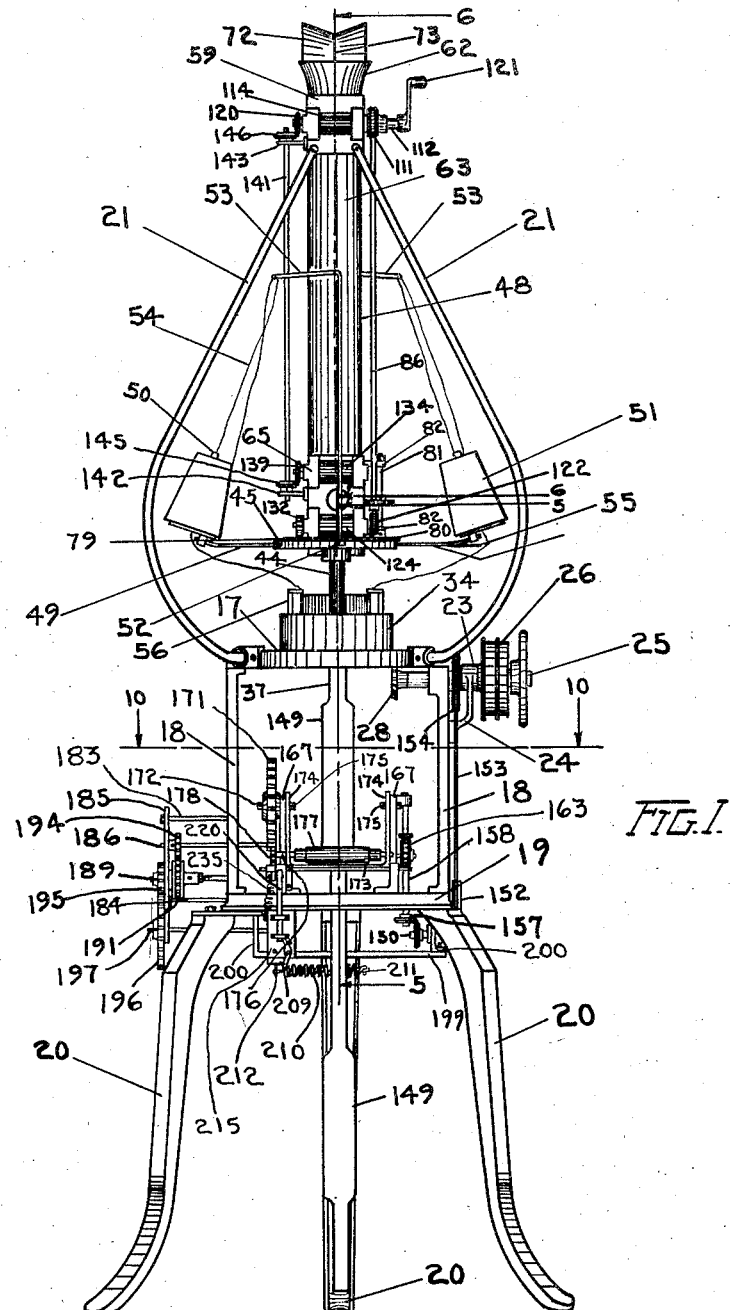
Figure 2:
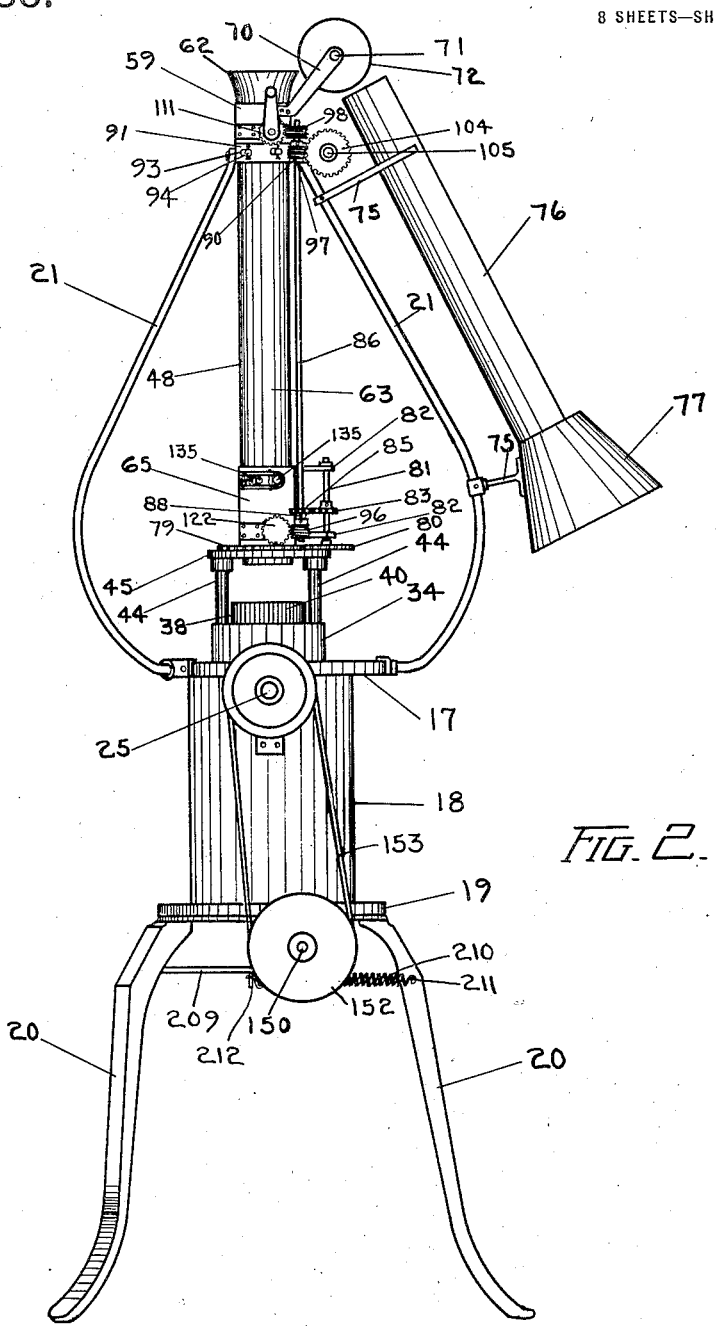
Figure 3:
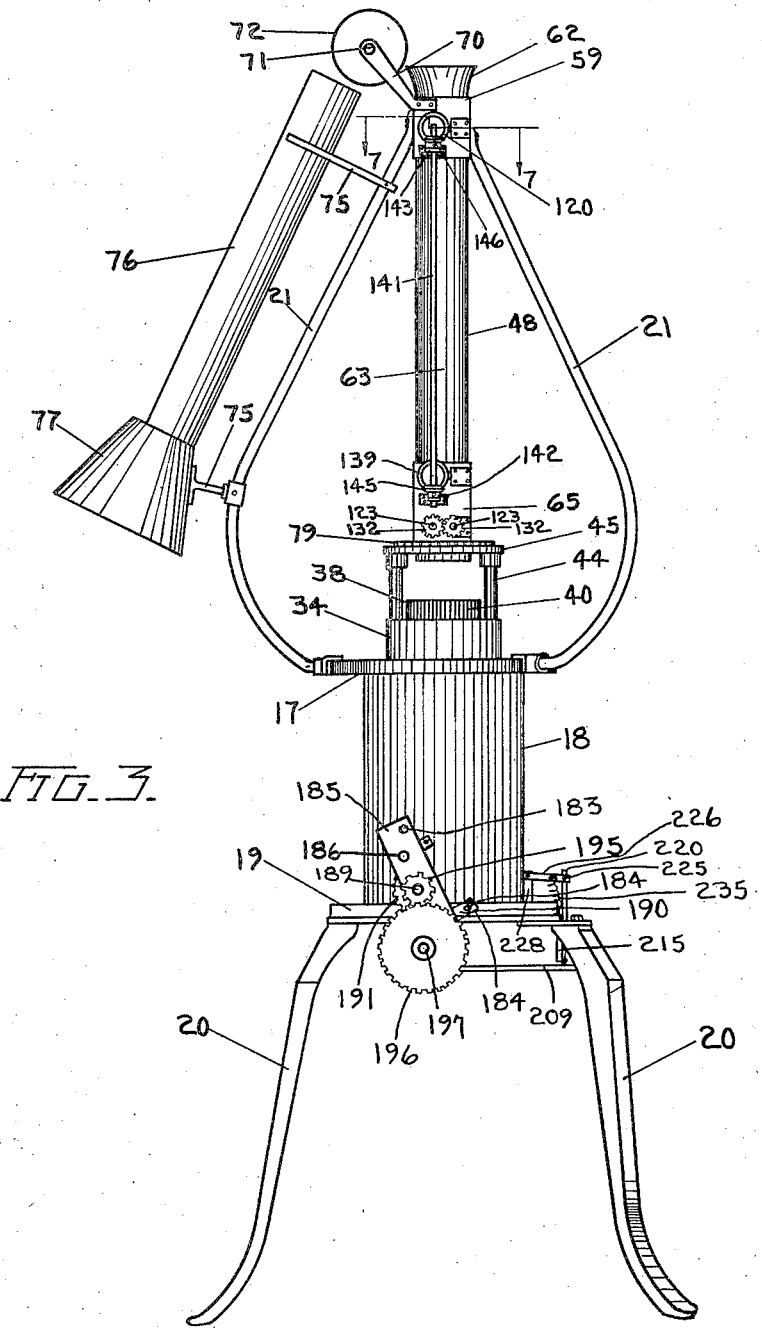
Figure 4:
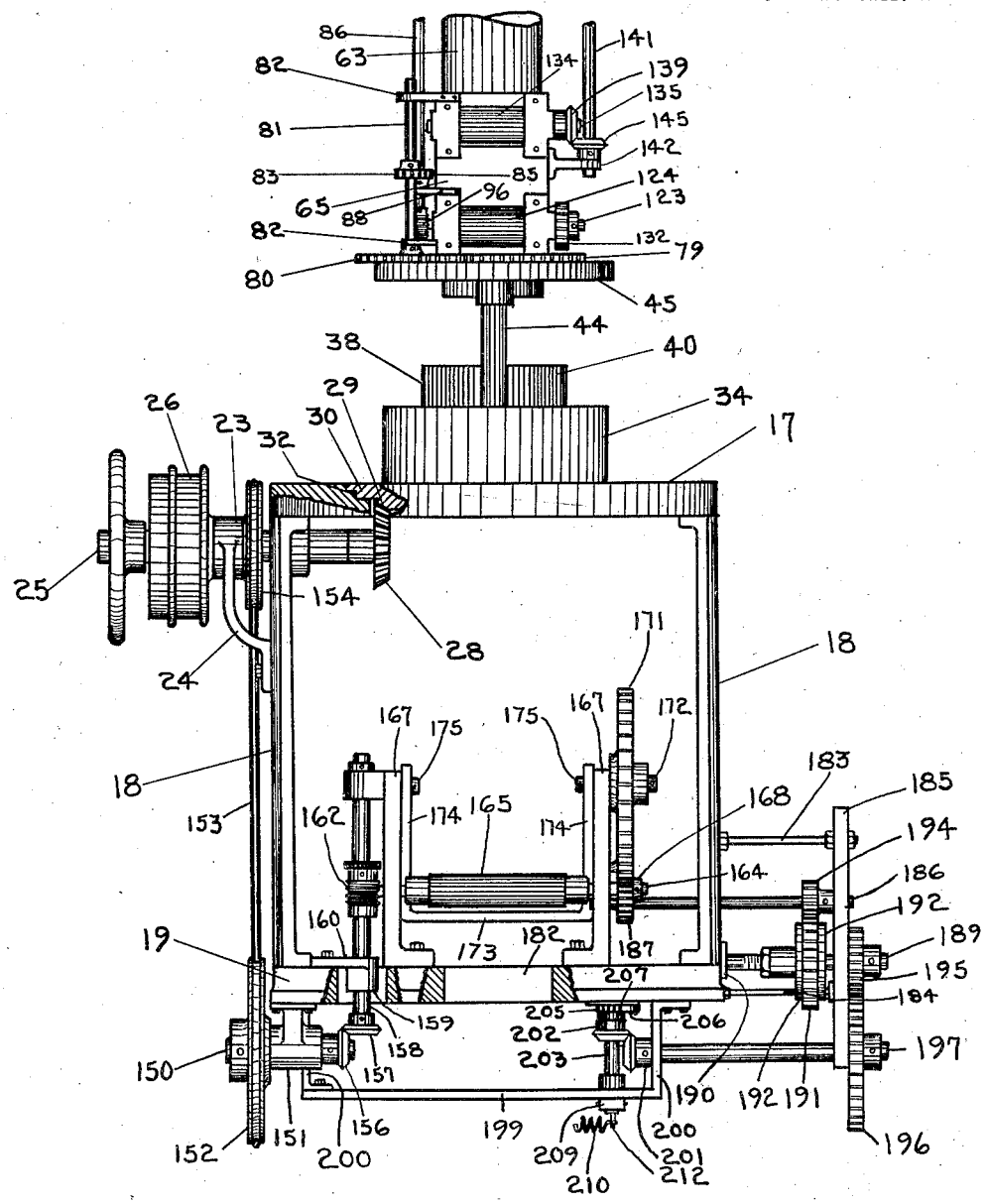
Figure 10:
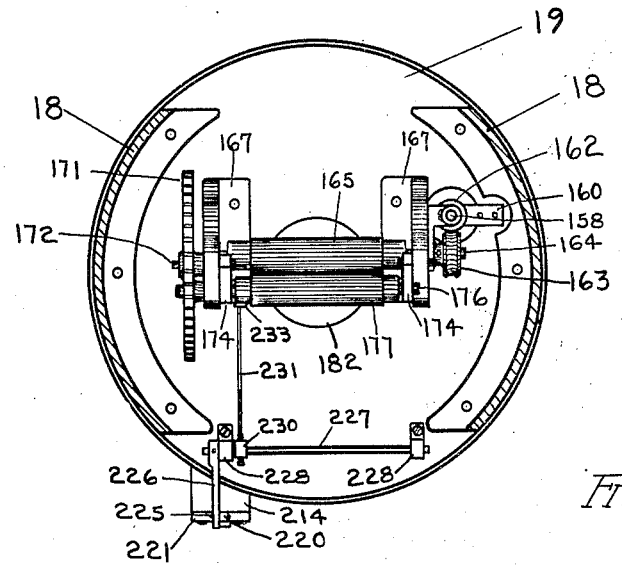
Figure 11:
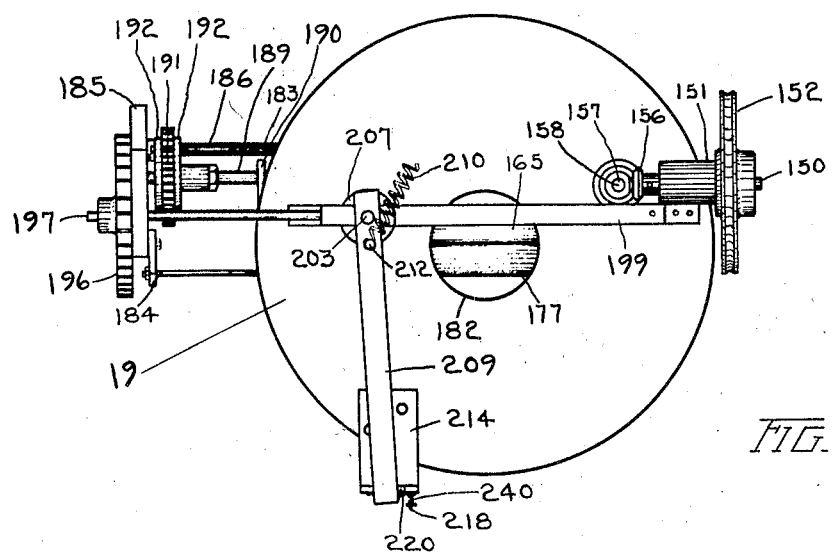
Figure 12:
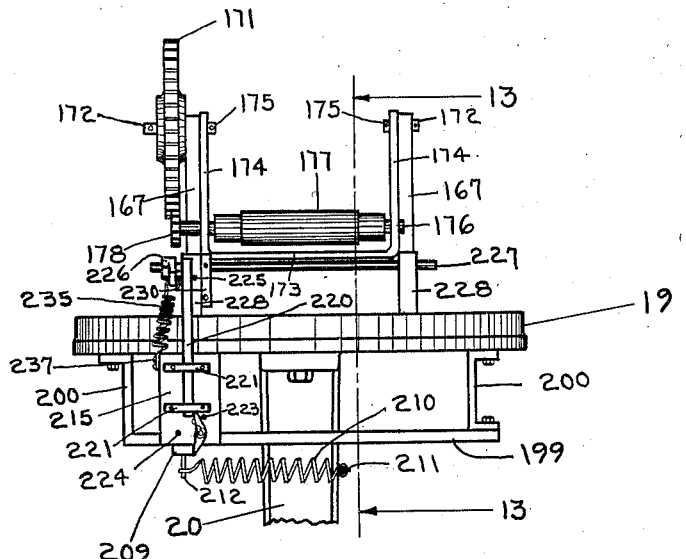
Figure 13:
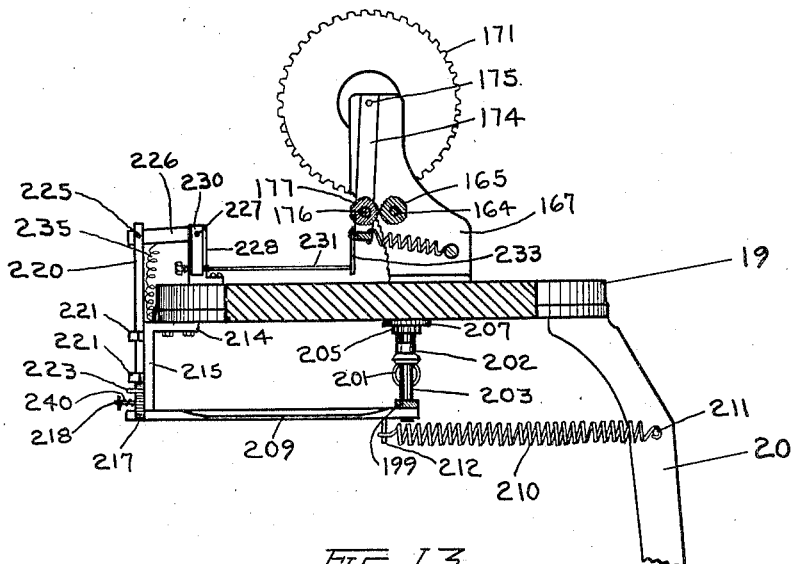

In the accompanying drawings which form a part of this specification, and which illustrate the principles of this invention, and the best mode now known to me of applying those principles, Figure 1 is a front elevation of a machine embodying my invention, Figures 2 and 3, side elevations of the same omitting certain parts, Figure 4, a rear elevation of a portion of the same partly in transverse section, Figures 5 and 6, sections of the lower and upper portions of the machine respectively on lines 5—5 and 6—6 of Figure 1, omitting certain parts, Figure 7, an enlarged section on line 7—7 of Figure 3, Figure 8, a detail of the slide actuating cam, Figure 9, an enlarged side elevation of the portion of the machine carrying the cam slide mechanism, Figure 10, a section on line 10—10 of Figure 1, Figure 11, a bottom plan view of the knife mechanism, Figure 12, an enlarged front elevation of the knife mechanism, and Figure 13, a section of the same on line 13—13 of Figure 12.

Like reference characters indicate like parts throughout the views.

The frame work of my machine may be of any form best adapted to carry the operative parts. In the form thereof herein shown it comprises a table 17 carried by supports 18, on a lower bed or table 19 mounted on legs 20. Fast to the table 17 are upwardly directed braces 21.

Rotatably mounted in one of the supports 18 and in a bearing 23 on a bracket arm 24 on the support is a driving shaft 25, carrying pulleys 26 and a bevel gear 28 engaging a bevel gear 29 integral with the base plate 30 of a knitting head. The base plate, which rotates in a cavity 32 in the table, has fast thereto the cam ring or casing 34 provided with an interior inclined endless cam channel 36. Within the casing is a needle cylinder 38 integral with or attached to the table forming a central opening 39 therein and provided with vertical external grooves 40 in which slide reciprocating knitting machine needles 41 of usual construction whose butts 42 register loosely in the channel 36. The rotation of the casing 34 reciprocates the needles to knit successive rows of stitches forming a depending tubular fabric sheath 37. Upon the casing 34 are posts 44 supporting a plate 45 provided with a central opening 46 in alignment with the needle cylinder to loosely receive a tubular guide 48. The rotating plate 45, as shown in Figure 1, has fast thereto the carrier arms 49 of spindles 50 for yarn spools 51. Arms 52 on the periphery of the plate carry oppositely located upright thread guides 53 for guiding the yarn 54 from the spools to lateral guide arms 55 fast to the periphery of the plate. Thence the yarn strands passes through the guides 56 fast to the casing 34 and directing the strands into the needles 41.

In detail the guide 48 comprises a rectangular block 59 having a cylindrical central bore 60, and fast to which are the upper ends of the braces 21. Fast to the top and bottom of the block respectively are a flaring portion 62 and a tube 63. The latter is fixed at its bottom to a block 65 provided with an internal cylindrical bore 66. The block has a tubular portion 68 extending loosely through the opening 46 and frictionally engaged in this instance by a downwardly tapering removable sleeve 69. Fast to the block 59 are upwardly inclined lateral arms 70 in which are journaled the shaft 71 of a guide roll 72 having a V shaped periphery 73. Upon one of the braces 21 in alignment with the roll are lateral arms 75 one of which engages an inclined guide trough 76, and the other of which engages the funnel shaped end 77 of the latter. A strip or sliver 79 of cotton or other absorbent material is drawn from a reel, receptacle, or elsewhere upwardly through the tube 77, 76, over roll 72, and thence downwardly through the guide member 48.

The means for drawing this strip includes an annular toothed wheel or driving gear 79 fast to the top of the rotating plate 45, and loose around the portion 68 of the guide 48. The gear 79 meshes with a gear 80 fast to a shaft 81 rotatably mounted in bracket arms 82 fast to the block 65. A gear 83 fast on shaft 81 engages a gear 85 on a vibratory or resilient vertical shaft 86 journaled near its lower end in a lug or arm 88 on the block 65, and near its upper end in a lug 90 on a slidable plate 91 provided with spaced oblong slots 93 to loosely receive pins 94 in the block 59. The upper portion of the rod 86 is vibrated by the horizontal reciprocation of the plate 91 on which it is journaled. Upon the lower portion of the rod is a worm 96, and near the top of the rod are worms 97 and 98. The plate 91, as shown in Figure 7, has a pin 100 to which is attached a helical spring 101 whose other end is fast to a bracket 102 by a screw 103 attaching the bracket to the block 59. This spring normally forces the teeth of a worm wheel 104, mounted on a pin 105 in the slide 91, into engagement with the worm 97. On the rear face of the worm wheel 104 is an arcuate cam shoulder 107 in slidable engagement with a stud 108 fast to the arm portion 109 of the bracket 102. The rotation of the wheel 104 therefore intermittently withdraws the worm 98 from its worm wheel 111 mounted on one of two shafts 112 mounted in the box 59, each carrying a preferably corrugated drawing roll 114. The second roll shaft is yieldingly mounted in slots 117, and its roll is forced against its companion roll by spring 118 and blocks 119. There is a gear 120 and a crank 121 upon the worm wheel shaft. The worm 96 engages a worm wheel 122 on one of a pair of shafts 123 carrying corrugated rolls 124 mounted in the block 65. One of the rolls is yieldingly mounted, being pressed against the other by springs 128 in bearing slots 129. There are gears intermeshing 132 on shafts 123. The rolls 124 are continuously rotatable since the lower portion of the rod 86 is not vibratory. Mounted above the latter rolls in the block 65 are a pair of preferably corrugated relatively yielding drawing or breaking rolls 134 on shafts 135. One shaft is pressed by springs 137 in slots 138, and the other shaft has a bevel gear 139. A shaft 141 is journaled in lugs 142 and 143 on the blocks 65 and 59 respectively, and carries gears 145 and 146 meshing with the gears 139 and 120 respectively. It will be observed that the pairs of drawing or breaking rolls 114, and 134 rotate at a like rate and at the same rate as do the delivery rolls 124, but intermittently, since both pairs of drawing rolls are subject to the operation of the cam gear 104. When the drawing rolls stop the delivery rolls sever from the strip 79 a length 148.

The operation of the needles 41 is continuous, and their speed is such relatively to the delivery rolls 124 that the depth of the casing 37 increases at identically the same speed as the strip 79 descends. The free end of the strip 79 descends by gravity under control of the feed or suspension rolls 124 centrally of and through the cylinder 38 and its needles 41. During the descent through the cylinder the length 148 is severed and released. Since the speed of the descending strip is identical with the speed of the travel or growth of the sheath 37 is simultaneously knit around the strip, rather than the strip drawn into the sheath. The use of the needles therefore makes no drawing in mechanism necessary.

Enlargements 149 occur at regular intervals in the sheath where the lengths 148 of absorbent material are enclosed and distend the sheath. Slack in the sheath 37 is prevented by take up or guide rolls operated as follows. A shaft 150 journaled in a bearing 151 on the table 19 carries a pulley 152 driven through a belt 153 from a pulley 154 on shaft 25. A gear 156 on shaft 150 engages a gear 157 on a shaft 158 journaled in a bearing 159 and a bracket 160 both mounted on the table. A worm 162 on the shaft 158 engages a worm gear 163 on the shaft 164 of a roll 165 mounted in uprights 167 on the table. A gear 168 on the shaft 164 engages an intermediate gear 169 on a stud 170 fast in one upright and meshing with a gear 171 mounted in a stud 172 on the upright. A swinging frame comprises a crosspiece 173 and arms 174 pivoted at their upper ends on pins 175 in the uprights. Journaled in the lower ends of the arms is the shaft 176 of a roll 177 and carrying a gear 178 meshing with the gear 171 by which it is driven. The roll 177 is drawn towards the roll 165 by a helical spring 179 having one end attached to the crosspiece 173 and its other end fast to a screw 181 in one of the uprights. The described rolls do not draw the sheath but merely guide the same, as the speed of roll 165 is the same as the speed of fabrication of the needles 41. The roll 177 being yielding admits passage of the enlargement 149. The sheath passes downwardly from the rolls through a central opening 182 in the table 19.

A device is provided for severing the sheath into individual units or napkins with the enlargements 149 disposed centrally of each leaving empty end portions to be utilized as attaching strips. It is therefore necessary that the sheath should be severed in each instance exactly midway between each of the two enlargements. This is effected by controlling the shearing mechanism by the vibration of the roll 177 under the influence of the passing enlargement. The shearing mechanism is the following.

An arm 183 on a support 18, and an arm 184 on the table, combined with a plate 185 fast thereto, constitute a depending bracket. A shaft 186 has its ends journaled in the plate 185 and one support 167, and carries a gear 187 meshing with the gear 169 by which the shaft is driven. A shaft 189 is journaled in the plate 185 and a plate 190 on the table 19, and carries a friction gear comprising a gear 191 loose on the shaft, and friction disks 192 engaging the gear and fast on the shaft. The latter gear is engaged by a gear 194 on the shaft 186. A gear 195 on the shaft 189 engages a gear 196 on a shaft 197 mounted near one end in the plate 185. Fast to the bottom of the table 19 is a rectangular frame or bracket comprising a flat bar 199 and supports 200 one of which assists in supporting the shaft 197. A bevel gear 201 on the latter engages a bevel gear 202 loose on a shaft 203 journaled at one end in the bar 199, and at its other end in the table 19. Fast to the bevel gear is a ratchet wheel 205 engaged by a yielding pawl 206 on a disk 207 fast to the shaft 203. Also fast to the shaft 203 is a shearing blade 209. A helical spring 210 has an end attached to a pin 211 in one of the legs 20, and another end attached to a pin 212 in the knife or blade 209. The latter is adapted to shearingly slide along the lower surface of the cooperating flat bar 199 arranged below the opening 182 and diametrically thereof to receive against its lateral edge the descending sheath 37.

The blade is held out of operation and periodically released by the following mechanism. Fast to the table 19 is the base 214 of a depending plate 215 whose lower edge the blade 209 is adapted to slidably contact. A lever on latch 217 is pivoted intermediate its length on a pin 218 in the plate 215, having its lower end pressing against the side of the knife, and its upper end abutting against a slidable locking rod 220 retained by straps 221 against the face of the plate. There are stop pins 223 and 224 for the lever in the plate. The rod 220 is pivoted by a pin 225 to an arm 226 fast to a rock shaft 227 mounted in bearings 228 on the table. Fast to the rock shaft is an arm 230 in the lower end of which is threaded for adjustment a wire or rod 231 adapted to contact with a depending finger 233 on an arm 174. The instant an enlargement on the casing begins to enter between the rolls 165 and 177 the frame of the latter roll swings outwardly and operates the described mechanism to elevate the rod 220 and free the upper part of the latch lever 217. The rod 220 is returned by a spring 235 having one end attached to the arm 226 and the other end to a screw 237 in the plate 215. The latch 217 is returned to original position by a hair spring 240 engaging the pivot pin 218 with one end, and the latch itself with its other end. The release of the latch 217 frees the blade 209 which under the influence of the strong spring 210, swings with great velocity and performs the cutting operation instantaneously by passing across the member 199.

Thereafter when the blade ceases to move because of the relaxation of the tension of the spring 210 the described blade rotating or setting mechanism carries the blade from its intermediate position around to original position against the lever latch indicated in Figure 12. The latch meanwhile has become locked by the descent of the rod 220 and forms a stop for the blade. The blade rotating mechanism, which comprises the parts between the shafts 186 and 197 inclusive, is in continuous operation, therefore the power thereof must be neutralized while the knife is against the latch. This end is effected by the friction gear 191 rotating while the plates 192 are inactive. While the knife is being swung under the impulse of the actuating spring the pawl 206 which normally drives the ratchet 205 rides freely over the teeth of the latter.

Without departing from the principle of my invention other modes of applying the principle may be employed instead of the one explained, change being made as regards the construction herein disclosed, provided the means stated by any of the following claims, or the equivalent of such stated means be employed.

I claim:—

1. The combination of a circular series of knitting needles adapted to fabricate a tubular casing, rolls adapted to intermittently deliver depending lengths of absorbent material centrally of the needles, and means actuating the needles for operating the rolls.

2. The combination of a needle cylinder, reciprocatory knitting needles slidably mounted on the cylinder, a rotary cam casing on the cylinder engaging the needles, a head plate on the casing provided with an opening, a stationary guide loose in the opening, delivery rolls in the guide, and means actuated by the casing for operating the rolls.

3. The combination of a needle cylinder, knitting needles slidably mounted on the cylinder, a rotary cam casing on the cylinder engaging the needles, a head plate on the casing provided with an opening in alignment with the bore of the cylinder, a stationary vertical guide loose in the opening, a pair of delivery rolls rotatably mounted in the guide, gears on the rolls, a gear fast to the head, and a driving connection between the last mentioned gear and the roll gears.

4. The combination of a needle cylinder, knitting needles on the cylinder, a cam casing rotatably mounted on the cylinder, a head plate on the casing provided with an opening, a vertical stationary guide above the opening, a pair of delivery rolls journaled in the lower end of the guide, drawing rolls journaled in the guide above the delivery rolls, and means actuated by the casing for operating the delivery rolls and the drawing rolls.

5. The combination of a needle cylinder, knitting needles slidably mounted on the cylinder, a cam casing rotatably mounted on the cylinder, a head plate on the casing provided with an opening, a stationary vertical guide above the opening, a pair of delivery rolls journaled in the lower portion of the guide, a pair of drawing rolls journaled in the guide above the delivery rolls, a reciprocable plate slidably mounted on the guide, a lug on the slidable plate, a vibratory shaft journaled in the lugs, a worm wheel on one delivery roll, a worm wheel on one drawing roll, worms on the shaft engaging the worm wheels, a third worm on the shaft, a gear fast on the casing, gear connections between the gear and the shaft, a worm wheel rotatably mounted on the slide engageable with the third worm, a curved cam shoulder on the side of the last mentioned worm wheel, a bracket on the guide, a stud on the bracket engaging the cam, and a spring connecting the slidable plate and the bracket.

6. The combination of a needle cylinder, knitting needles on the cylinder, a cam casing rotatably mounted on the cylinder, a head plate on the casing provided with an opening, a vertical stationary guide above the opening, a pair of delivery rolls journaled in the lower end of the guide, a pair of drawing rolls journaled in the guide above the delivery rolls, means actuated by the casing for operating the delivery rolls and the drawing rolls, and means for intermittently withdrawing the drawing rolls out of operation.

7. The combination of a frame, a needle cylinder on the frame, knitting needles on the cylinder, a rotary cam casing embracing the cylinder and needles, a head plate on the casing provided with an opening, means for actuating the casing, braces on the table, a vertical tubular guide supported by the braces centrally of the opening, delivery rolls mounted in the lower portion of the guide, drawing rolls mounted in the guide above the delivery rolls, means actuated by the casing for operating the delivery rolls and the drawing rolls, and an inclined guide fast to the upper portion of the first guide.

8. The combination of a frame, means on the frame for knitting a tubular sheath, a vertical guide on the frame above the knitting means, rolls in the guide adapted to deliver lengths of absorbent material to the sheath, and guide rolls in the frame beneath the knitting means adapted to engage the sheath.

9. The combination of a frame, means on the frame for knitting a tubular sheath, a guide on the frame above the knitting means, rolls in the guide for delivering intermittently lengths of absorbent material to the sheath, a pair of guide rolls yieldable relatively to each other mounted in the frame below the knitting means and in the path of the sheath, and means actuating the delivery rolls and the guide rolls.

10. The combination of a frame, means on the frame for knitting a tubular sheath, a guide for a sliver of absorbent material mounted on the frame above the knitting means, rolls in the guide for intermittently delivering lengths of absorbent material to the sheath, uprights in the frame below the knitting means, a guide roll rotatably mounted in the supports, a frame pivotally mounted on the supports and depending therefrom, a second guide roll journaled in the frame, a spring connecting the frame with the uprights to hold the guide rolls in contact with each other, and means actuating the knitting means and the delivery rolls for operating the first mentioned guide roll.

11. The combination of a frame, a needle cylinder on the frame, reciprocating knitting needles slidably mounted on the frame for forming a depending tubular sheath, delivery rolls supported by the frame above the cylinder for intermittently delivering lengths of absorbent material centrally of the cylinder to the sheath, a rotary blade supported by the frame below the cylinder movable across the path of the sheath, and means actuating the needles and delivery rolls for operating the blades.

12. The combination of a frame, a needle cylinder in the frame, reciprocatory knitting needles slidably mounted on the cylinder for forming a depending tubular sheath, delivery rolls supported by the frame above the cylinder for delivering successive lengths of absorbent material centrally of the cylinder to the sheath to form intermittent enlargements of the sheath, a relatively stationary guide roll supported in the frame in the path of the sheath, a relatively vibratory guide roll supported in the frame cooperating with the first guide roll to embrace the sheath and vibrated by engagement with the enlargements, a blade pivotally mounted in the frame below the guide rolls adapted to swing across the path of the sheath, a spring for actuating the blade, a latch normally in contact with the blade for locking the blade against movement, means actuated by the vibratory roll for moving the latch out of engagement with the blade, means for reciprocating the needles and the guide rolls, and means operated by the needle actuating means for actuating the stationary guide roll.

13. The combination of a frame, a needle cylinder in the frame, knitting needles slidably mounted in the cylinder for knitting a depending sheath, a cam casing rotatably mounted in the frame embracing the needles and casing, delivery rolls supported by the frame for delivering lengths of absorbent material centrally of the cylinder to the sheath forming enlargements of the sheath, a driving shaft in the frame for actuating the cam casing and the delivery rolls, a guide roll supported in the frame in the path of the sheath also driven by the driving shaft, a vibratory guide roll supported in the frame cooperating with the first guide roll to embrace the sheath and vibrated by the enlargements, a blade shaft mounted in the frame below the guide rolls, a blade fast to the blade shaft, a spring engaging the frame, and the spring for swinging the blade, a latch normally in contact with the blade for locking the blade against movement, means actuated by the vibratory roll for moving the latch out of engagement with the blade to permit the blade to swing, and driving connections between the first guide roll and the blade shaft.

In testimony whereof I have affixed my signature.

HOWARD W. GREEN.